US007834881B2

(12) United States Patent
Liu et al.

(10) Patent No.: US 7,834,881 B2
(45) Date of Patent: Nov. 16, 2010

(54) OPERAND COLLECTOR ARCHITECTURE

(75) Inventors: Samuel Liu, Cupertino, CA (US); John Erik Lindholm, Saratoga, CA (US); Ming Y Siu, Santa Clara, CA (US); Brett W. Coon, San Jose, CA (US); Stuart F. Oberman, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1048 days.

(21) Appl. No.: 11/555,649

(22) Filed: Nov. 1, 2006

(65) Prior Publication Data

US 2008/0109611 A1 May 8, 2008

Related U.S. Application Data

(63) Continuation-in-part of application No. 10/889,730, filed on Jul. 13, 2004, now Pat. No. 7,339,592.

(51) Int. Cl.
*G09G 5/36* (2006.01)
*G09G 5/39* (2006.01)
*G06F 15/80* (2006.01)

(52) U.S. Cl. .................. 345/557; 345/531; 345/505

(58) Field of Classification Search .................. 345/501, 345/502, 505, 506, 530, 531, 554, 557, 559
See application file for complete search history.

(56) References Cited

U.S. PATENT DOCUMENTS

| | | | | |
|---|---|---|---|---|
| 4,532,589 A | * | 7/1985 | Shintani et al. | 712/217 |
| 4,964,042 A | * | 10/1990 | Sterling et al. | 712/201 |
| 5,604,878 A | * | 2/1997 | Colwell et al. | 712/217 |
| 5,701,426 A | * | 12/1997 | Ryan | 711/3 |
| 5,913,049 A | * | 6/1999 | Shiell et al. | 712/215 |
| 6,091,430 A | | 7/2000 | Bodin et al. | |
| 6,092,175 A | | 7/2000 | Levy et al. | |
| 6,154,826 A | | 11/2000 | Wulf et al. | |
| 6,167,486 A | | 12/2000 | Lee et al. | |
| 6,615,340 B1 | * | 9/2003 | Wilmot, II | 712/209 |

(Continued)

FOREIGN PATENT DOCUMENTS

EP    0 962 856    8/1999

(Continued)

OTHER PUBLICATIONS

Eggers, et al. "Simultaneous Multithreading: A Platform for Next-Generation Processors," *IEEE Micro*, vol. 17, No. 5, pp. 12-19, Sep./Oct. 1997.

(Continued)

*Primary Examiner*—Joni Hsu
(74) *Attorney, Agent, or Firm*—Patterson & Sherian, LLP

(57) ABSTRACT

An apparatus and method for simulating a multi-ported memory using lower port count memories as banks. A collector units gather source operands from the banks as needed to process program instructions. The collector units also gather constants that are used as operands. When all of the source operands needed to process a program instruction have been gathered, a collector unit outputs the source operands to an execution unit while avoiding writeback conflicts to registers specified by the program instruction that may be accessed by other execution units.

20 Claims, 13 Drawing Sheets

U.S. PATENT DOCUMENTS

| | | |
|---|---|---|
| 6,795,889 B2 | 9/2004 | Berg et al. |
| 6,833,831 B2 * | 12/2004 | Emberling et al. .......... 345/506 |
| 7,120,783 B2 * | 10/2006 | Fotland et al. ............. 712/228 |
| 7,376,954 B2 * | 5/2008 | Kissell ....................... 718/107 |
| 2002/0103990 A1 | 8/2002 | Potash |
| 2003/0041228 A1 | 2/2003 | Rosenbluth et al. |
| 2003/0163669 A1 | 8/2003 | DeLano |
| 2004/0080512 A1 | 4/2004 | McCormack et al. |
| 2006/0012603 A1 | 1/2006 | Lindholm et al. |

FOREIGN PATENT DOCUMENTS

| | | |
|---|---|---|
| JP | 62-242243 | 10/1987 |
| JP | 6-332721 | 12/1994 |
| JP | 11-184674 | 7/1999 |
| JP | 2003-241961 | 8/2003 |
| JP | 2003-256199 | 9/2003 |

OTHER PUBLICATIONS

Carl A. Waldspurger, et al. "Register Relocation: Flexible contexts for Multithreading", Proceedings of the Annual International Symposium on Computer Architecture, vol. Symp. 20, May 16, 1993 pp. 120-130.

English Abstract of JP 62-242243 (provided as explanation of relevance).

English Translation of JP 6-332721 (provided as explanation of relevance).

English Translation of JP 11-184674 (provided as explanation of relevance).

English Translation of JP 2003-241961 (provided as explanation of relevance).

English Translation of JP 2003-256199 (provided as explanation of relevance).

* cited by examiner

OPERAND COLLECTOR ARCHITECTURE

CROSS-REFERENCE TO RELATED APPLICATIONS

This application is a continuation-in-part of U.S. patent application Ser. No. 10/889,730 filed Jul. 13, 2004, now U.S. Pat. No. 7,339,592, which is herein incorporated by reference.

BACKGROUND OF THE INVENTION

1. Field of the Invention

One or more aspects of the invention generally relate to data processing, and more particularly to using single port memories to simulate a multi-ported memory in a programmable graphics processor or general purpose processor.

2. Description of the Related Art

Current data processing includes systems and methods developed to execute program instructions, including instructions with two or more operands. The operands are stored in registers within the processor for efficient access during the execution of a program. Some program instructions, such as, multiply and multiply-accumulate specify two or more operands. Conventionally, a register file includes a multi-ported memory so that two or more locations, each location storing an operand, may be read in a single clock cycle. Therefore, all of the operands needed for at least one program instruction may be acquired and output to an execution unit in a single clock cycle.

Compared with a single ported memory, a multi-ported memory requires more die area and uses more power. However, unlike a multi-ported memory, only a single location may be read in each clock cycle. Therefore, two or more clock cycles are needed to acquire the operands needed to execute one program instruction, reducing performance compared with a multi-ported memory.

Accordingly, it would be desirable to provide the performance advantages of a multi-ported register file within a processor using less die area and power.

SUMMARY OF THE INVENTION

The current invention involves new systems and methods for simulating a multi-ported memory using lower port count memories as banks. A portion of memory is allocated for storing data associated with a thread. The portion of memory allocated to a thread may be stored in a single bank or in multiple banks. A collector unit coupled to each bank gathers source operands needed to process an instruction as the source operands are output from one or more banks. The collector unit outputs the source operands to an execution unit when all of the source operands needed to process the instruction have been gathered. Using lower port count memories to simulate a multi-ported memory requires less die area than a multi-ported memory of comparable capacity. Lower port count memories configured to simulate a multi-ported memory also have lower power requirements compared with a multi-ported memory of comparable capacity.

Various embodiments of a method of the invention for arbitrating read requests for a memory bank include receiving a first read request for a first operand that is stored in the memory bank and specified by a first program instruction to be executed by a first execution pipeline, receiving a second read request for a second operand that is stored in the memory bank and specified by a second program instruction to be executed by the first execution pipeline, selecting the first read request for output to the memory bank, determining whether a cache miss has occurred for a constant read request associated with the first program instruction, discarding the first read request when a constant read cache miss has occurred for the first program instruction, and selecting the second read request for output to the memory bank when a constant read cache miss has occurred for the first program instruction.

Various embodiments of a method of the invention for dispatching program instructions and operands for execution include selecting a first program instruction and operands for execution by a first execution unit from a set of eligible program instructions to produce a value for storage in a first register that is specified by a first destination operand, determining if a writeback conflict exists for the first register and any destination operands that are produced by a second execution unit that has priority over the first execution unit, and selecting a second program instruction and operands for execution by the first execution unit from the set of eligible program instructions when the writeback conflict exists.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
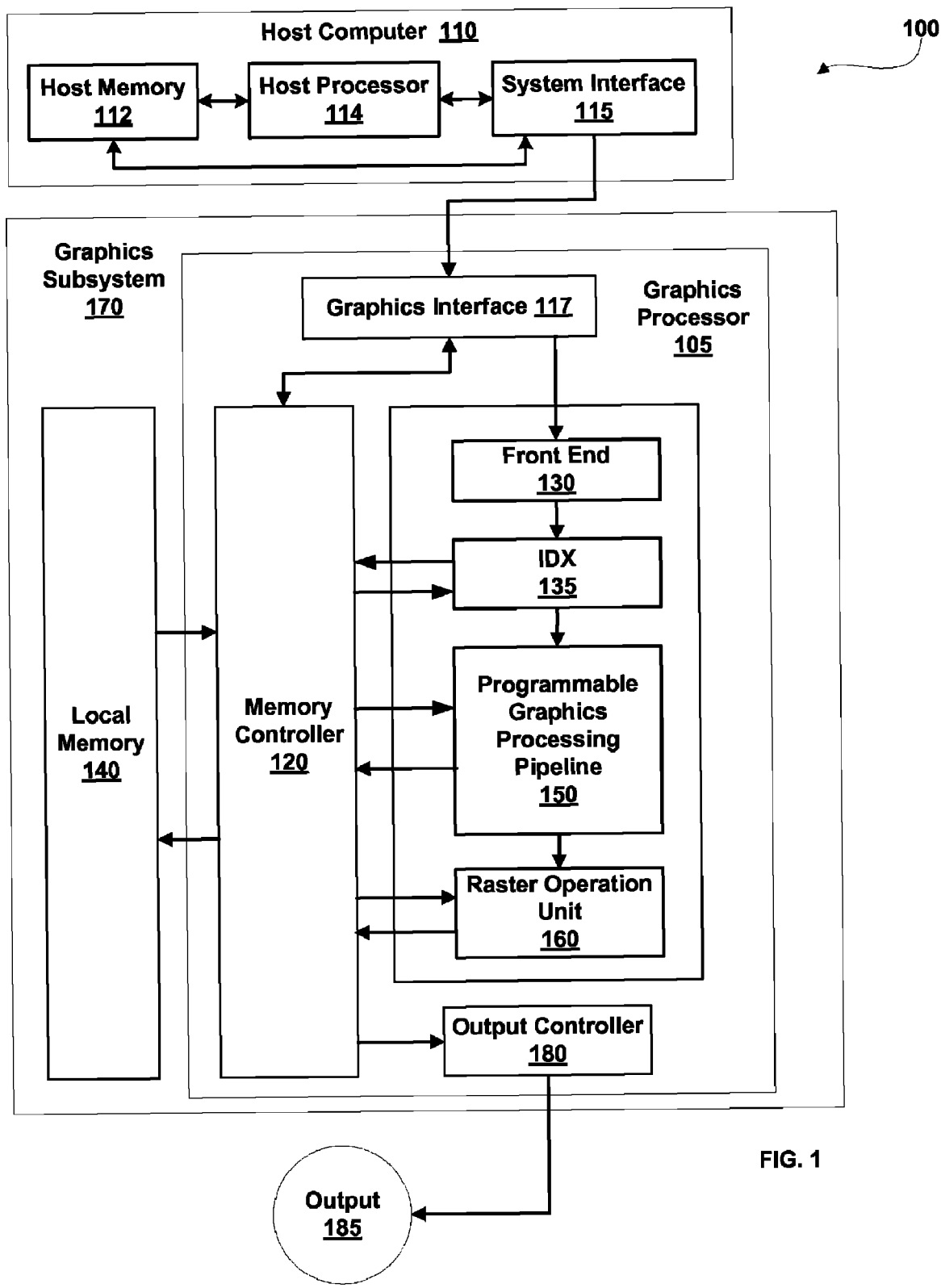
FIG. 1 is a block diagram of an exemplary embodiment of a respective computer system in accordance with one or more aspects of the present invention including a host computer and a graphics subsystem.

FIG. 1 is an illustration of a Computing System generally designated 100 and including a Host Computer 110 and a Graphics Subsystem 170. Computing System 100 may be a desktop computer, server, laptop computer, palm-sized computer, tablet computer, game console, portable wireless terminal such as a personal digital assistant (PDA) or cellular telephone, computer based simulator, or the like. Host Computer 110 includes Host Processor 114 that may include a system memory controller to interface directly to Host Memory 112 or may communicate with Host Memory 112 through a System Interface 115. System Interface 115 may be an I/O (input/output) interface or a bridge device including the system memory controller to interface directly to Host Memory 112. An example of System Interface 115 known in the art includes Intel® Northbridge.

Host Computer 110 communicates with Graphics Subsystem 170 via System Interface 115 and a Graphics Interface 117 within a Graphics Processor 105. Data received at Graphics Interface 117 can be passed to a Front End 130 or written to a Local Memory 140 through Memory Controller 120. Graphics Processor 105 uses graphics memory to store graphics data and program instructions, where graphics data is any data that is input to or output from components within the graphics processor. Graphics memory may include portions of Host Memory 112, Local Memory 140, register files coupled to the components within Graphics Processor 105, and the like.

Graphics Processor 105 includes, among other components, Front End 130 that receives commands from Host Computer 110 via Graphics Interface 117. Front End 130 interprets and formats the commands and outputs the formatted commands and data to an IDX (Index Processor) 135. Some of the formatted commands are used by Programmable Graphics Processing Pipeline 150 to initiate processing of data by providing the location of program instructions or graphics data stored in memory. IDX 135, Programmable Graphics Processing Pipeline 150 and a Raster Operation Unit 160 each include an interface to Memory Controller 120 through which program instructions and data can be read from memory, e.g., any combination of Local Memory 140 and Host Memory 112. When a portion of Host Memory 112 is used to store program instructions and data, the portion of Host Memory 112 can be uncached so as to increase performance of access by Graphics Processor 105.

IDX 135 optionally reads processed data, e.g., data written by Raster Operation Unit 160, from memory and outputs the data, processed data and formatted commands to Programmable Graphics Processing Pipeline 150. Programmable Graphics Processing Pipeline 150 and Raster Operation Unit 160 each contain one or more programmable processing units to perform a variety of specialized functions. Some of these functions are table lookup, scalar and vector addition, multiplication, division, coordinate-system mapping, calculation of vector normals, tessellation, calculation of derivatives, interpolation, and the like. Programmable Graphics Processing Pipeline 150 and Raster Operation Unit 160 are each optionally configured such that data processing operations are performed in multiple passes through those units or in multiple passes within Programmable Graphics Processing Pipeline 150. Raster Operation Unit 160 includes a write interface to Memory Controller 120 through which data can be written to memory.

In a typical implementation Programmable Graphics Processing Pipeline 150 performs geometry computations, rasterization, and fragment computations. Therefore, Programmable Graphics Processing Pipeline 150 is programmed to operate on surface, primitive, vertex, fragment, pixel, sample or any other data. For simplicity, the remainder of this description will use the term "samples" to refer to graphics data such as surfaces, primitives, vertices, pixels, fragments, or the like.

Samples output by Programmable Graphics Processing Pipeline 150 are passed to a Raster Operation Unit 160, which optionally performs near and far plane clipping and raster operations, such as stencil, z test, and the like, and saves the results or the samples output by Programmable Graphics Processing Pipeline 150 in Local Memory 140. When the data received by Graphics Subsystem 170 has been completely processed by Graphics Processor 105, an Output 185 of Graphics Subsystem 170 is provided using an Output Controller 180. Output Controller 180 is optionally configured to deliver data to a display device, network, electronic control system, other computing system such as Computing System 100, other Graphics Subsystem 170, or the like. Alternatively, data is output to a film recording device or written to a peripheral device, e.g., disk drive, tape, compact disk, or the like.

Figure 2:
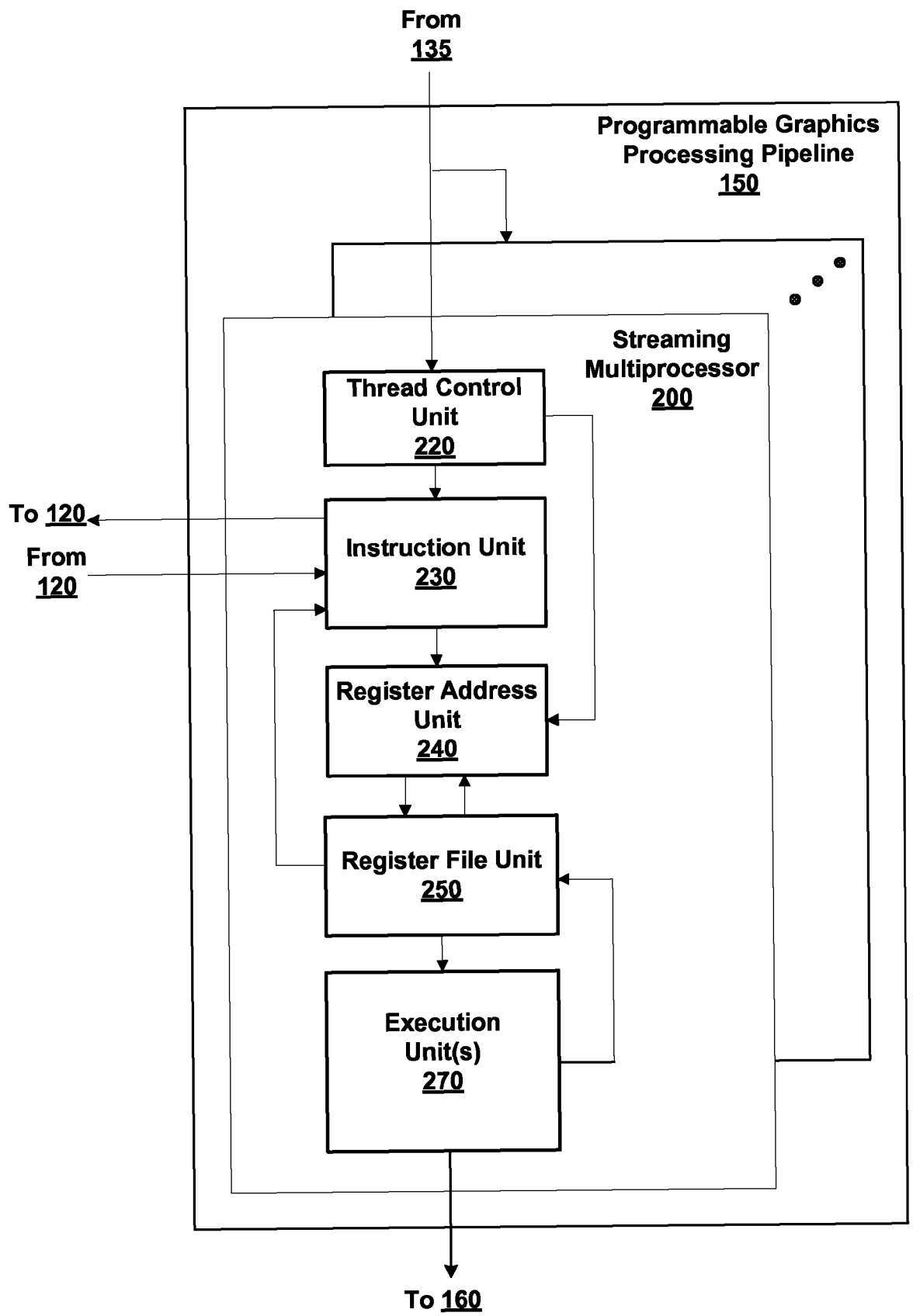
FIG. 2 is a block diagram of an exemplary embodiment of the Programmable Graphics Processing Pipeline of FIG. 1 in accordance with one or more aspects of the present invention.

FIG. 2 is an illustration of Programmable Graphics Processing Pipeline 150 of FIG. 1. At least one set of samples is output by IDX 135 and received by Programmable Graphics Processing Pipeline 150 and the at least one set of samples is processed according to at least one program, the at least one program including graphics program instructions. A program can process one or more sets of samples. Conversely, a set of samples can be processed by a sequence of one or more programs. Some embodiments of Programmable Graphics Processing Pipeline 150 include additional units configured to perform specific functions such as rasterization of primitive data to generate fragment data.

Samples, e.g., surfaces, primitives, processed data, or the like, are received by Programmable Graphics Processing Pipeline 150 from IDX 135. Surfaces may be processed by Streaming Multiprocessors 200 to produce primitives, the primitives may be processed by Streaming Multiprocessors 200 to produce vertices, and the vertices may be processed by Streaming Multiprocessors 200 to produce fragments. In alternative embodiments of the present invention one or more Steaming Multiprocessors 200 is included within a general purpose processor, such as Host Processor 114. Programmable Graphics Processing Pipeline 150 includes one or more Streaming Multiprocessors 200, as shown in FIG. 2. Each Streaming Multiprocessor 200 includes at least Execution Unit(s) 270, to be described further herein. The samples may be processed by any one of the Streaming Multiprocessors 200. In some embodiments of Streaming Multiprocessor 200, a read interface (not shown in FIG. 2) is used to read graphics data such as texture maps from Local Memory 140 or Host Memory 112 via Memory Controller 120. A sample is accepted by a Streaming Multiprocessor 200 when a processing thread within the Streaming Multiprocessor 200 is available, as described further herein.

A Thread Control Unit 220 within a Streaming Multiprocessor 200 receives samples and a pointer to a sequence of program instructions to be executed to process the samples. Thread Control Unit 320 assigns a thread to each sample to be processed. A thread includes a pointer to a program instruction (program counter), such as the first instruction within the program, thread state information, and storage resources for storing operands used and generated during processing of the sample. When a resource, e.g. storage resource for storing operands or thread state information, needed to process a thread is not available, the Streaming Multiprocessor 200 will not accept additional samples for processing. When the program instructions associated with a thread have completed execution, the storage resources, e.g., registers, allocated to store operands received and generated during execution of the thread become available for allocation to another thread, i.e., the storage resources are deallocated and the thread is flagged as available in Thread Control Unit 220.

Thread Control Unit 220 outputs allocation information specifying the quantity of storage resources needed for storing operands to a Register Address Unit 240. Thread Control Unit 220 outputs the pointer and the samples to an Instruction Unit 230. The number of pointers and samples that can be output each clock cycle from Thread Control Unit 220 to Instruction Unit 230 may vary between different embodiments of the present invention.

Instruction Unit 230 uses a dedicated read interface to read the program instructions from Local Memory 140 or Host Memory 112 via Memory Controller 120. In an alternate embodiment of the present invention, a single Instruction Unit 230 is shared between Streaming Multiprocessors 200. In some embodiments of the present invention, Instruction Unit 230 includes an instruction cache.

Instruction Unit 230 executes instructions which do not process data, such as jump, call/return, or branch instructions. Instruction Unit 230 schedules the execution of the program instructions, interleaving the program instructions to process any threads that are active, i.e., assigned to a sample. In some embodiments of the present invention, Instruction Unit 230 schedules the execution of the program instructions without additional information specifying the specific locations of the registers within a Register File Unit 250 that are allocated to the threads, e.g., the bank that the registers are located in.

Instruction Unit 230 may be configured to use fixed or programmable priorities when scheduling program instructions for threads. For example, threads allocated to process vertex program instructions may always get higher priority than threads allocated to process fragment program instructions. In another example, threads requiring a large number of registers for storing operands may have higher priority than threads requiring fewer registers for storing operands. In some embodiments of the present invention, Instruction Unit 230 receives information from a Register File Unit 250 indicating utilization of registers for particular threads and Instruction Unit 230 adjusts the priority of the particular threads accordingly to reduce or increase the utilization of registers in Register File Unit 250.

In other embodiments of the present invention, Instruction Unit 230 schedules the execution of the program instructions using additional information specifying the specific locations of the registers within a Register File Unit 250. For example, the program instructions are pre-sorted into groups based on the bank within Register File Unit 250 where one or more of the operands for the instruction are stored. Instruction Unit 230 selects one program instruction from each group in a round-robin fashion, outputting one or more program instructions to Register Address Unit 240 each clock cycle.

Instruction Unit 230 outputs the program instructions and samples to Register Address Unit 240. Register Address Unit 240 accesses registers within Register File Unit 250 that store operands specified by each thread, as described in conjunction with FIG. 3 and FIG. 5. Register Address Unit 240 outputs requests for each program instruction. Examples of requests include a read request for a specific operand or a write request for a specific operand. In one embodiment of the present invention, Register Address Unit 240 outputs requests for a single instruction during each clock cycle. For example, for a load instruction (LD), one (1) write request is output to write an operand to a register. Similarly, for a multiply-accumulate (MAD) instruction, 3 read requests (one for each source operand) and 1 write request (for the destination operand) are output.

Register Address Unit 240 outputs the requests and a corresponding program instruction, e.g., MAD, to Register File Unit 250. Register File Unit 250 processes the requests, reading operands from and writing operands to registers within Register File Unit 250. Register File Unit 250 schedules processing of the requests to avoid write back conflicts and cycle based conflicts. In some embodiments of the present invention, Register File Unit 250 uses a scoreboard unit to track the status of operand writes to registers to determine when an operand may be read from a register.

When read requests are processed to acquire operands needed to process a program instruction, Register File Unit 250 determines when all of the operands have been acquired and then outputs the program instruction and operands to Execution Unit(s) 270 for processing. Execution Unit(s) 270 returns processed operands to Register File Unit 250 to be written to destination operands as specified by program instructions. Execution Pipeline 240 is configured by the program instructions to perform operations such as tessellation, perspective correction, interpolation, shading, blending, and the like. Processed samples are output from each Execution Pipeline 240 to Raster Operation Unit 160. In some embodiments of the present invention, additional Execution Pipelines 240 are coupled to Register File Unit 250 and Raster Operation Unit 160.

Figure 3:
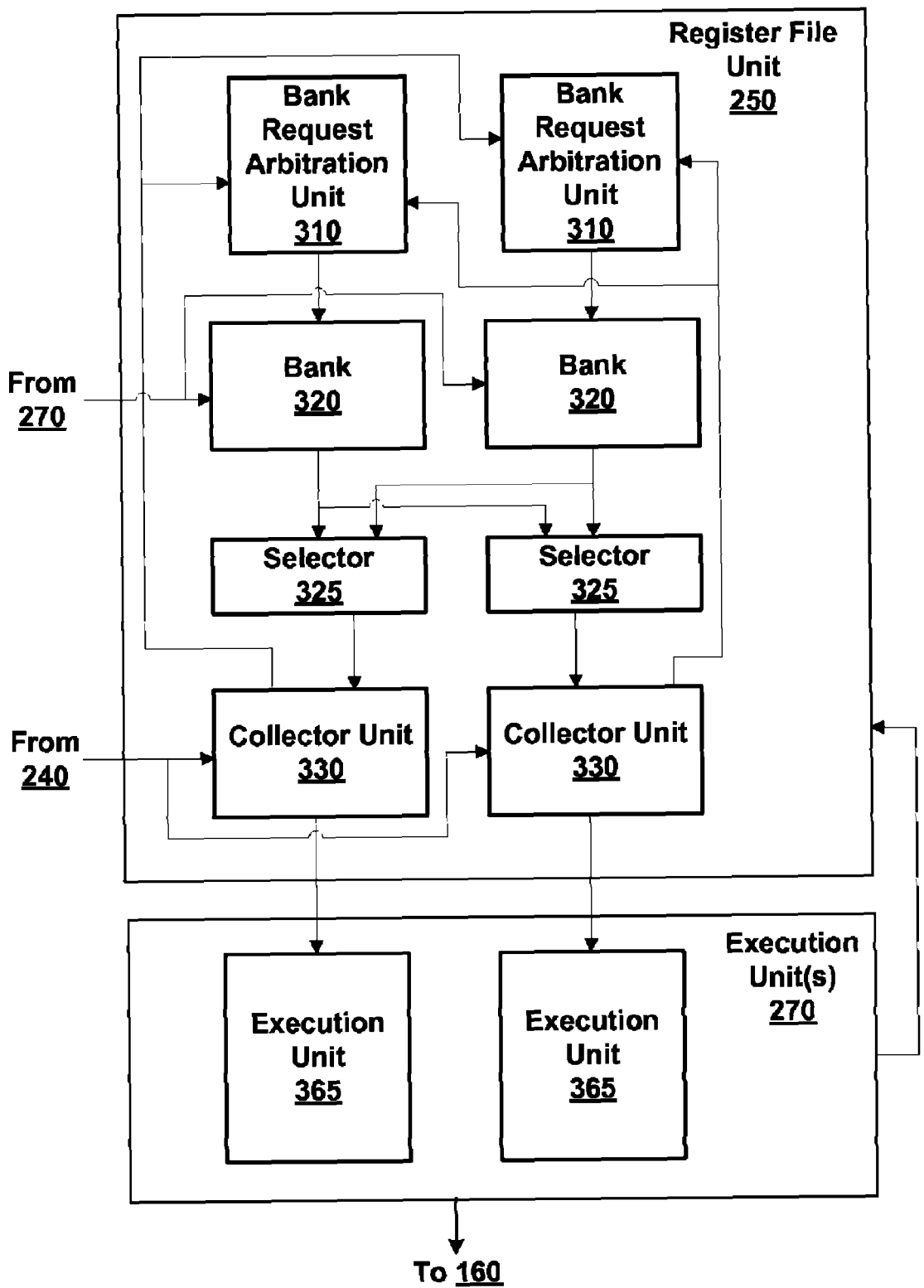
FIG. 3 is a block diagram of an exemplary embodiment of the Register File Unit of FIG. 2 in accordance with one or more aspects of the present invention.

FIG. 3 is a block diagram of an exemplary embodiment of Register File Unit 250 shown in FIG. 2 in accordance with one or more aspects of the present invention. In alternate embodiments of the present invention Register File Unit 250 is used within a general purpose processor, such as Host Processor 114. Register File Unit 250 includes two or more memory banks, Banks 320 that are configured to simulate a single multi-ported memory. Each Bank 320 includes several locations which function as registers that are configured to store operands. Each Collector Unit 330 receives the requests and the corresponding program instruction from Register Address Unit 240 and determines if the program instruction is an instruction for execution by the particular Execution Unit 365 coupled to the Collector Unit 330. If the program instruction is an instruction for execution by the particular Execution Unit 365 coupled to the Collector Unit 330, the Collector Unit 330 accepts the program instruction and requests for processing. In some embodiments of the present invention, each Execution Unit 365 is identical and a priority scheme is used to determine which Execution Unit 365 will execute the program instruction. Alternative embodiments of the present invention assign the instruction to the least-loaded Execution Unit 365. In some embodiments of the present invention two or more Collector Units 330 are coupled to a single Execution Unit 365 and a priority scheme is used to choose which of the two or more Collector Units outputs operands to the single Execution Unit 365 for processing.

Each Collector Unit 330 outputs requests for accepted program instructions to any Bank Request Arbitration Unit 310. Each Bank Request Arbitration Unit 310 determines if the request requires a read of a register in the particular Bank 320 coupled to the Bank Request Arbitration Unit 310. Some possible register allocations are described in conjunction with FIGS. 4A, 4B, 4C, 4D, 4E, and 4F. Each request is output by one Bank Request Arbitration Unit 310 to the Bank 320 where the register assigned to the operand specified in the request is located. Accepted program instructions remain in Collector Units 330 designated to gather the operands. Each Bank Request Arbitration Unit 310 also arbitrates between the different Collect Units 330 and outputs one request per clock cycle to the Bank 320 coupled to the Bank Request Arbitration Unit 310.

Each Bank 320 includes a read request port for receiving requests from a Bank Request Arbitration Unit 310. Each Bank 320 also includes a write request port for receiving write requests from Execution Unit(s) 270 to write processed data to a destination register assigned to an operand specified by a program instruction. Therefore, 2 banks of lower port count memories (1 write port and 1 read port) are used to simulate a multi-port memory with 2 write ports and 2 read ports. In some embodiments of the present invention, additional request ports are used. In other embodiments of the present invention, the read request port is combined with the write request port, accessing a single-port memory. During a clock cycle, each Bank 320 may output an operand specified by read request to a corresponding Collector Unit 330 via a Selector 325. Therefore, when a program instruction specifies 3 operands for source data, at least 3 clock cycles are needed to gather the operands when they reside in the same Bank 320. Each Collector Unit 330 may also gather source data, such as constants and immediate data that are stored in registers outside of Banks 320 (not shown). Selectors 325 receive source data not stored in Banks 320 from inputs (not shown). When all of the operands are gathered by a Collector Unit 330, the program instruction is ready to be dispatched. In some embodiments of the present invention, additional Bank Request Arbitration Units 310, Banks 320, Selectors 325, and Collector Units 330 are included to increase the number of operands that are read during a clock cycle. In one embodiment of the present invention, Selectors 325 are omitted and each Bank 320 is coupled directly to a Collector Unit 330.

When all of the operands for a program instruction have been gathered by a Collector Unit 330, the program instruction and operands are output by the Collector Unit 330 to the Execution Unit 365 coupled to the Collector Unit 330 for processing. When execution of the program instruction is completed, the Execution Unit 365 outputs a write request to one of Banks 320 if a destination operand was specified by the program instruction. Execution Unit 270(s) may also output processed operands to Raster Operation Unit 160. In some embodiments of the present invention, each Execution Unit 365 processes more than one instruction resulting in a throughput of more than one instruction per clock cycle. Execution of different instructions may incur different latencies as they are processed by Execution Unit 365.

Figure 4A:
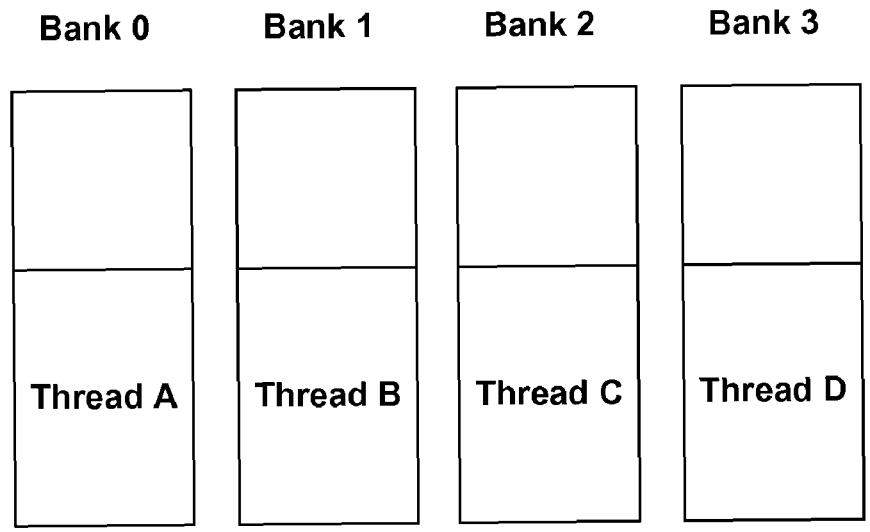
FIG. 4A is an exemplary embodiment of an allocation of registers for processing threads in accordance with one or more aspects of the present invention.

In one embodiment of the present invention, registers for storing operands for processing a thread may be allocated within a single bank, such as a Bank 320. Such an allocation is referred to as a "thin" allocation type. FIG. 4A is an exemplary embodiment of a thin allocation of registers for processing threads in 4 banks accordance with one or more aspects of the present invention. In FIG. 4A registers to store operands for processing Thread A are allocated in Bank 0, registers to store operands for processing Thread B are allocated in Bank 1, registers to store operands for processing Thread C are allocated in Bank 2, and registers to store operands for processing Thread D are allocated in Bank 3. Registers to store operands for processing additional threads may be allocated in Bank 0, Bank 1, Bank 2, and/or Bank 3. In alternative embodiments of the present invention, fewer or more banks are used.

Figure 4B:
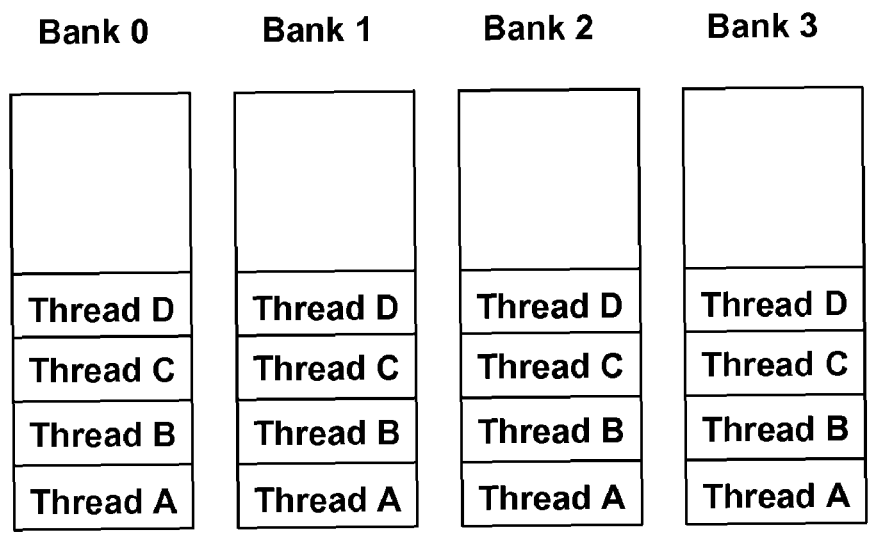
FIGS. 4B, 4C, and 4D are other exemplary embodiments of allocations of registers for processing threads in accordance with one or more aspects of the present invention.

In another embodiment of the present invention, registers for storing operands for processing a thread may be allocated within each of the 4 banks, where each bank may be a Bank 320. Such an allocation is referred to as a "fat" allocation type. FIG. 4B is an exemplary embodiment of a fat allocation of registers for processing threads in 4 banks accordance with one or more aspects of the present invention. In FIG. 4B registers to store operands for processing Thread A are allocated in Bank 0, Bank 1, Bank 2, and Bank 3. Registers to store operands for processing Threads B, C, and D are also allocated in Bank 0, Bank 1, Bank 2, and Bank 3. In alternative embodiments of the present invention, fewer or more banks are used.

In some embodiments of the present invention, registers for processing threads are allocated in "bank count" units representing a specific number of registers in either a fat or thin allocation type. A register base address indicating the next available register for allocation may be tracked in Bank 0 and the next available registers in the other banks may be determined using the bank count, the allocation type, and the register base address.

Figure 4C:
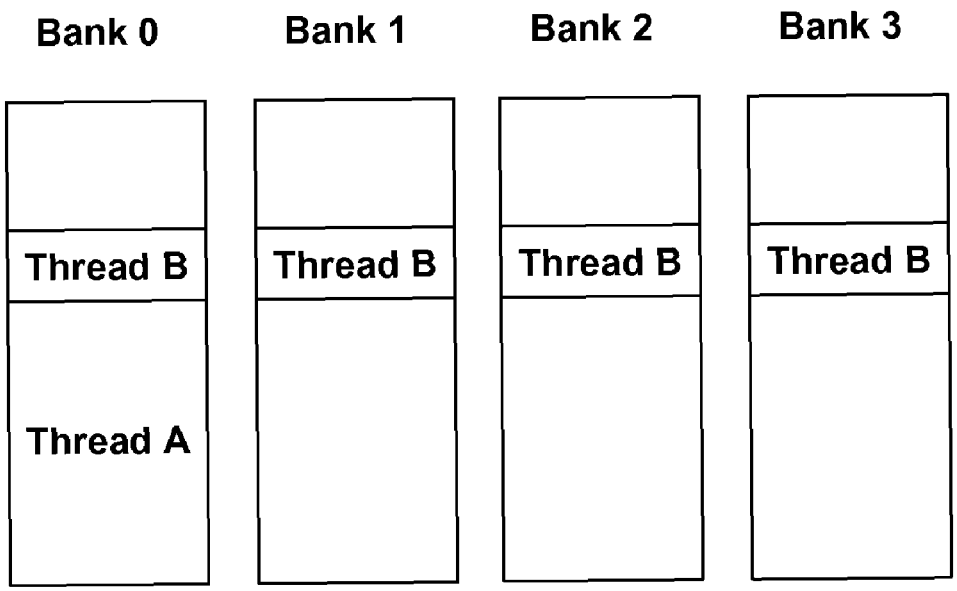
Figure 4D:
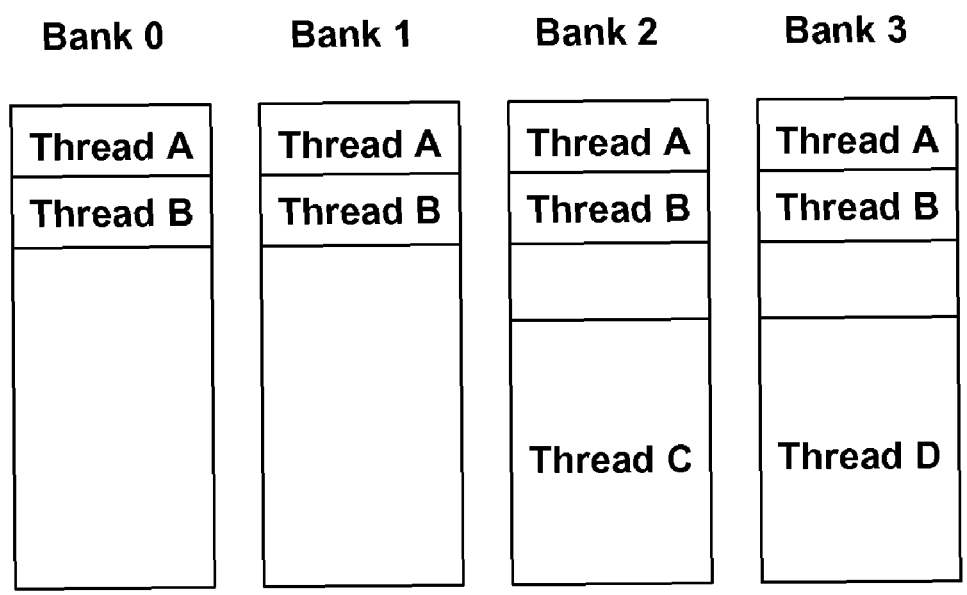

Registers to store operands for processing additional threads may be allocated in Bank 0, Bank 1, Bank 2, and/or Bank 3 using either a fat or a thin allocation. However, mixing fat and thin allocation types may result in poor utilization of the registers available for allocation as shown in FIG. 4C. For example, when a first thread, such as Thread A uses a thin allocation in Bank 0 and a second thread, such as Thread B uses a fat allocation in each of the 4 banks, a third thread using a thin allocation may be delayed until execution of the first thread is completed. Alternatively, in some embodiments of the present invention, fat allocation types may be made from the top of each bank and thin allocation types may be made from the bottom of each bank, as shown in FIG. 4D. Threads A and B use a fat allocation and Threads C and D use a thin allocation. This "splitting" of the allocations permits packing of same allocation types to more efficiently utilize the registers available for allocation.

Figure 4E:
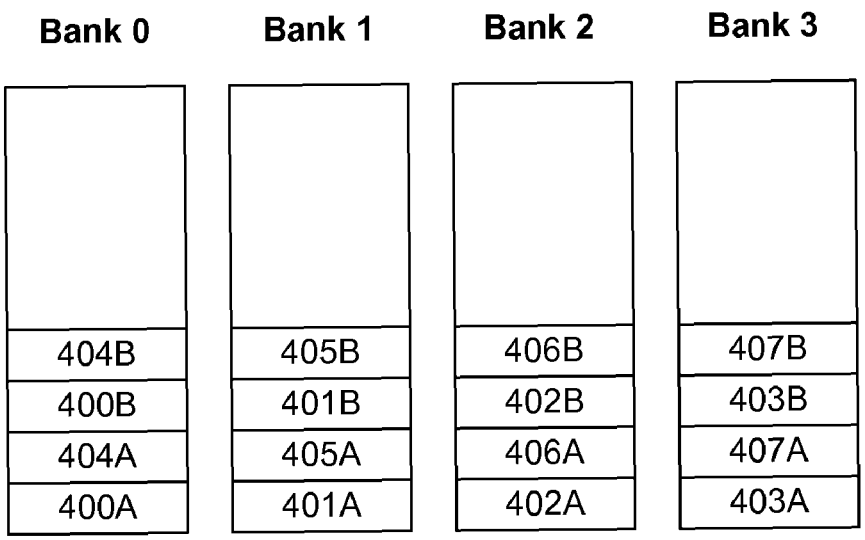
FIG. 4E is an exemplary embodiment of an assignment of registers for threads in accordance with one or more aspects of the present invention.

When a fat allocation is used for threads, the location assigned to each operand may simply proceed in a sequential order. FIG. 4E is an exemplary embodiment of an assignment of registers for threads in a sequential order in accordance with one or more aspects of the present invention. For example, a register allocated to thread A assigned to store Operand 400A is located in Bank 0, as is a register allocated to thread B assigned to store Operand 400B. If thread A and thread B are executing the same program instructions it is possible that a bank conflict will occur when thread A and thread B process a program instruction that reads Operand 400A for thread A and Operand 400B for thread B. The bank conflict may be avoided if Operand 400B and Operand 400A are not stored in the same bank.

Figure 4F:
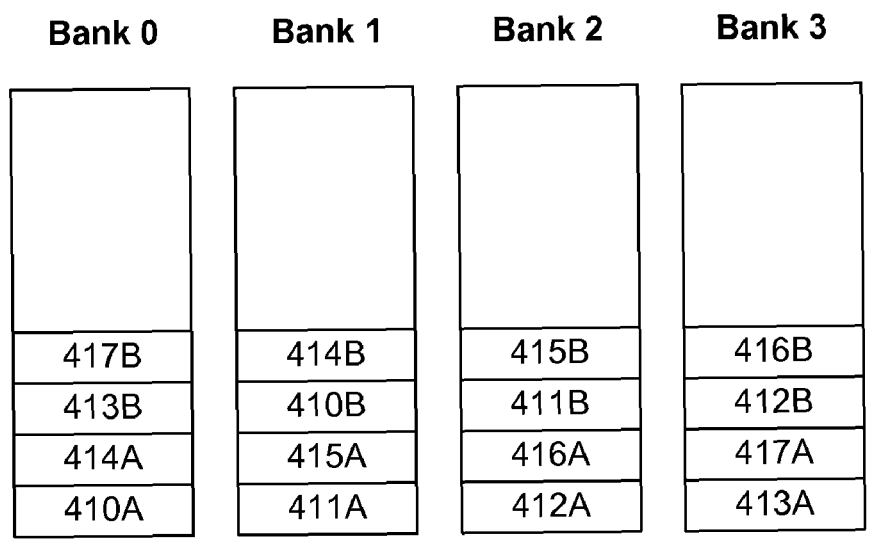
FIG. 4F is another exemplary embodiment of an assignment of registers for threads in accordance with one or more aspects of the present invention.

A phase value may be used during the register assignment process so that threads processing the same program instruction will not have their corresponding operands specified by the program instruction assigned to registers that are in the same bank. FIG. 4F is an exemplary embodiment of an assignment of registers for threads using a phase value in accordance with one or more aspects of the present invention. For example, a register allocated to thread A assigned to store Operand 410A is located in Bank 0, and a register allocated to thread B assigned to store Operand 410B is located in Bank 1. If thread A and thread B are executing the same program instructions a bank conflict does not occur when thread A and thread B process a program instruction that reads Operand 410A for thread A and Operand 410B for thread B. In an alternate embodiment of the present invention, registers are remapped so that threads processing the same program instruction will not have their corresponding operands specified by the program instruction assigned to registers that are in the same bank. For example, with 4 Banks, the lower two bits of an assigned register number may be exclusive ORed (XOR) with a unique phase value corresponding to the thread that the register is allocated to. An alternative method of the present invention is to take modulo the number of Banks of the sum of the assigned register number and the phase value.

When a fat allocation is used for registers, it is possible that two or more operands needed to process a program instruction will be assigned to registers in two or more different banks. For example if a program instruction for thread A specifies Operands 414A and 415A, read requests will be queued in two different Request Queues 310, one coupled to Bank 0 and the other coupled to Bank 1. Likewise, Operand 414A will be output to the Collector Unit 330 coupled to Bank 0 and Operand 415A will be output to the Collector Unit 330 coupled to Bank 1. Since a single Collector Unit 330 gathers the operands for each program instruction, a mechanism is used to permit the transfer of operands between the different banks and Collector Units 330.

Figure 5:
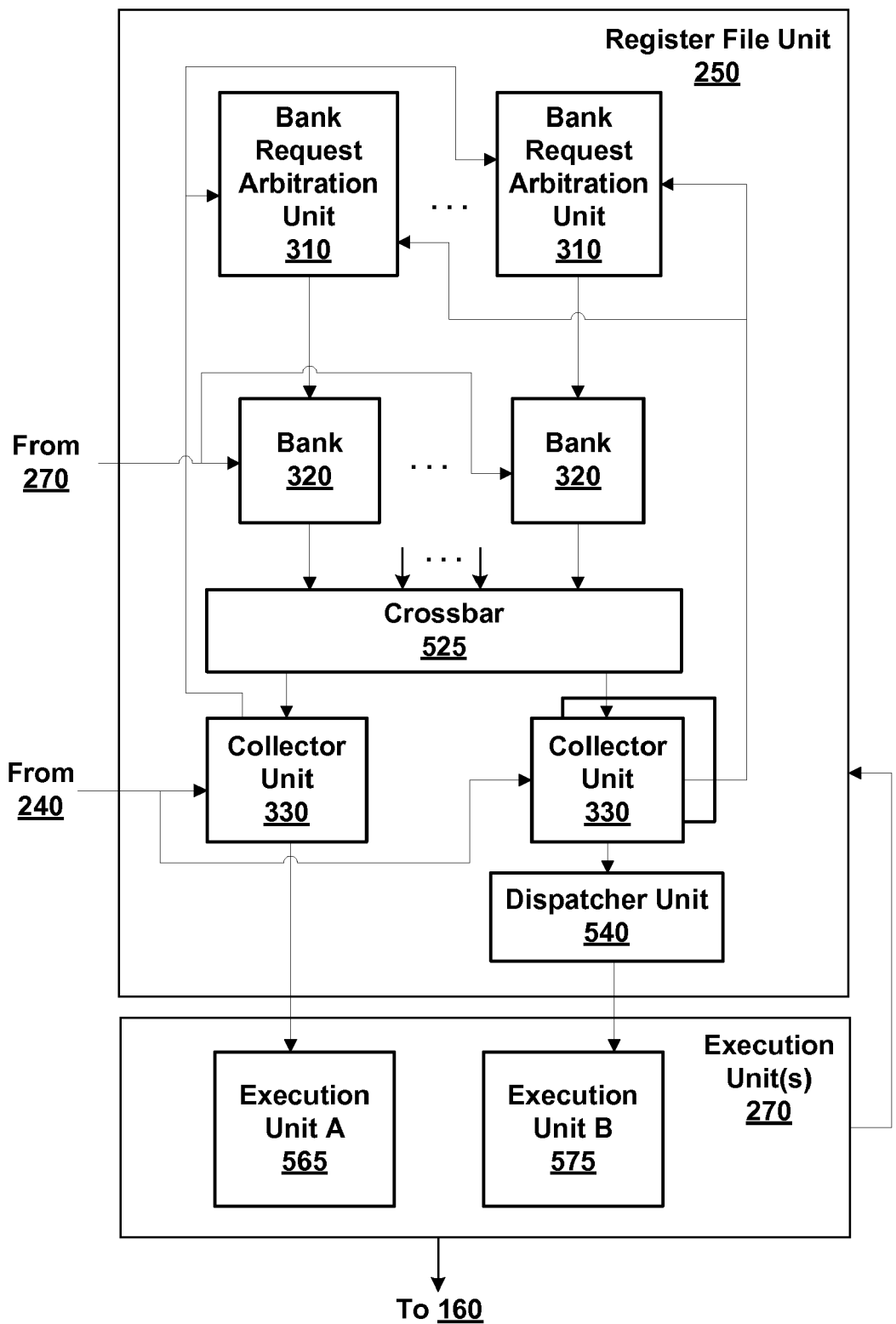
FIG. 5 is a block diagram of another exemplary embodiment of the Register File Unit of FIG. 2 in accordance with one or more aspects of the present invention.

FIG. 5 is a block diagram of another exemplary embodiment of the Register File Unit of FIG. 2 including a Crossbar 525 and a plurality of Banks 320, each Bank 320 coupled to a Bank Request Arbitration Unit 310, in accordance with one or more aspects of the present invention. Crossbar 525 is configured such that an operand output from any Bank 320 may be routed to the input of any Collector Unit 330. Therefore, all of the operands specified by a program instruction may be collected by a single Collector Unit 330. As described in conjunction with FIG. 3, each Collector Unit 330 gathers operands specified by a program instruction from any Bank 320. When Crossbar 525 is used thread scheduling and register allocation (fat or thin) may proceed more efficiently than when the number of Banks 320 is equal to the total number of Collector Units 330.

A Dispatcher Unit 540 is coupled between a set of Collector Units 330 and an Execution Unit B 575. Dispatcher Unit 540 may receive program instructions and corresponding operands, e.g., inputs, from each Collector Unit 330 within the set, therefore Dispatcher Unit 540 arbitrates between the Collector Units 330 within the set. In some embodiments of the present invention, Dispatcher Unit 540 arbitrates in a round-robin fashion. In other embodiments of the present invention, each Collector Unit 330 within the set has a corresponding priority and Dispatcher Unit 540 accepts inputs from each Collector Unit 330 based on the priority. For example, one Collector Unit 330 may have higher priority than the other Collector Units 330 and Dispatcher Unit 540 will always accept inputs from the one Collector Unit 330 if a program instruction and operands are available.

A single Collector Unit 330 is directly coupled to an Execution Unit A 565. Execution Unit A 565 may be configured to execution specific instructions that Execution Unit B 575 is not configured to execute. Therefore, single Collector Unit 330 accepts program instructions (and requests) for execution by Execution Unit A 565 and set of Collector Units 330 accepts program instructions (and requests) for execution by Execution Unit B 575.

Figure 6A:
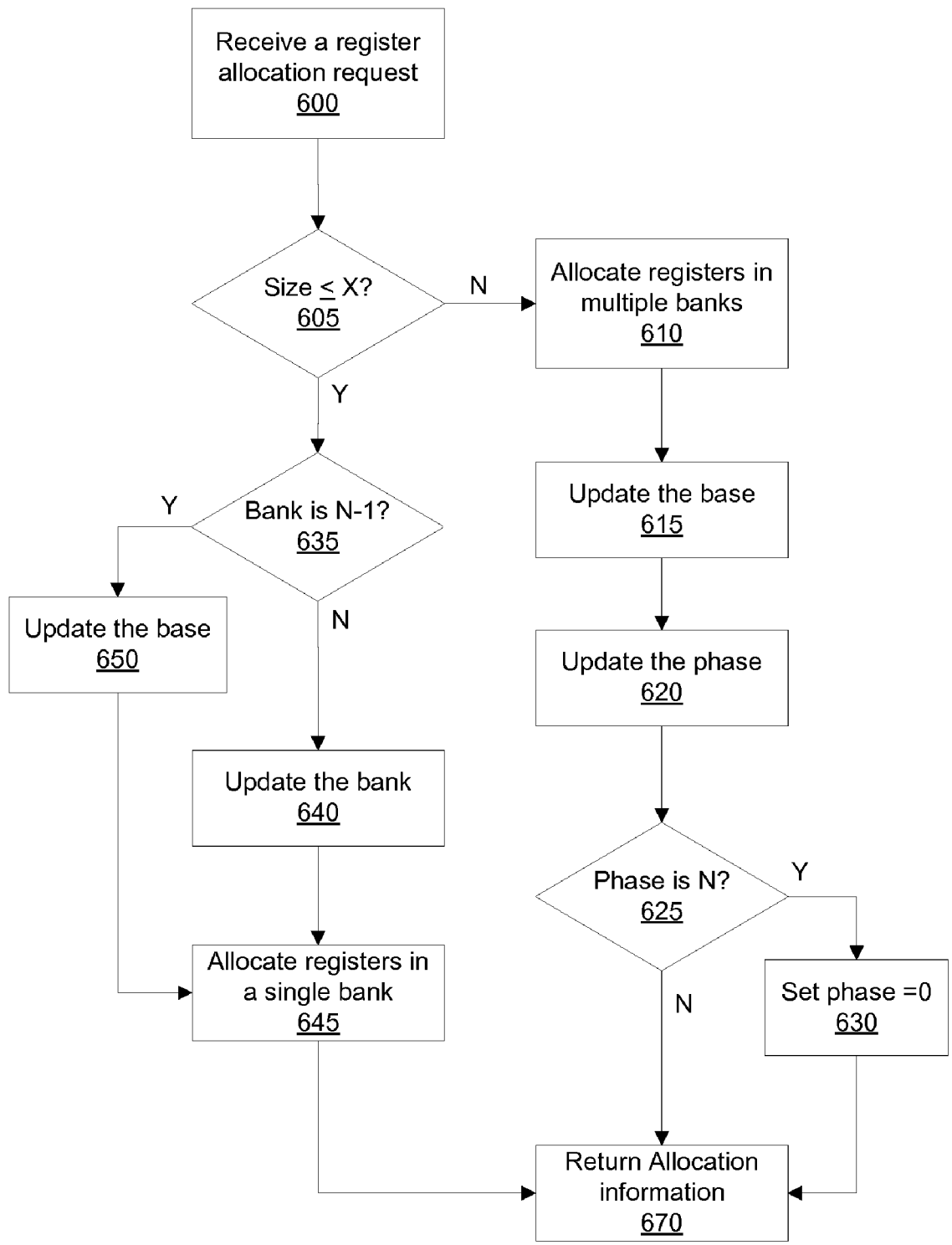
FIG. 6A illustrates an embodiment of a method of allocating registers for processing a thread in accordance with one or more aspects of the present invention.

FIG. 6A illustrates an embodiment of a method of allocating registers for processing a thread in accordance with one or more aspects of the present invention. In step 600 a register allocation request for a thread is received by Register Address Unit 240 from Thread Control Unit 220. In step 605 Register Address Unit 240 determines if the size, i.e., number of registers, needed to process the thread is less than or equal to a fixed or programmable value, X. If, Register Address Unit 240 determines the size is greater than X, then in step 610 Register Address Unit 240 allocates registers for storing operands in multiple Banks 320, i.e. a fat allocation. In step 615, Register Address Unit 240 updates a base pointer. The base pointer indicates the first location available for allocation within Banks 320.

In step 620 Register Address Unit 240 updates a phase value, so that registers assigned to operands allocated for a subsequent thread will be skewed relative to the registers allocated in step 610. In step 625 Register Address Unit 240 determines if the phase value is equal to N, where N is the number of Banks 320. If, in step 625, Register Address Unit 240 determines that the phase value is equal to N, in step 630, Register Address Unit 240 sets the phase value to 0 and proceeds to step 670. If, in step 625, Register Address Unit 240 determines that the phase value is not equal to N, Register Address Unit 240 proceeds to step 670 and outputs the allocation information to Request Distribution Unit 300 within Register File Unit 250.

If, in step 605 Register Address Unit 240 determines the size is less than or equal to X, then in step 635 Register Address Unit 240 determines if the Bank 320 available for a thin allocation is N–1. If, in step 635, Register Address Unit 240 determines the Bank 320 available for allocation is bank N–1, as specified by a bank indicator, then in step 650 Register Address Unit 240 updates the base to indicate the first location available for allocation and proceeds to step 645. If, in step 635, Register Address Unit 240 determines the Bank 320 available for allocation is not bank N–1, then in step 640 Register Address Unit 240 updates the bank indicator by incrementing the bank indicator by 1. In step 645 Register Address Unit 240 allocates registers for storing operands in a single Bank 320, i.e. a thin allocation, specified by the bank indicator and proceeds to step 670. As previously described, in step 670 Register Address Unit 240 outputs the allocation information to Request Distribution Unit 300 within Register File Unit 250.

Figure 6B:
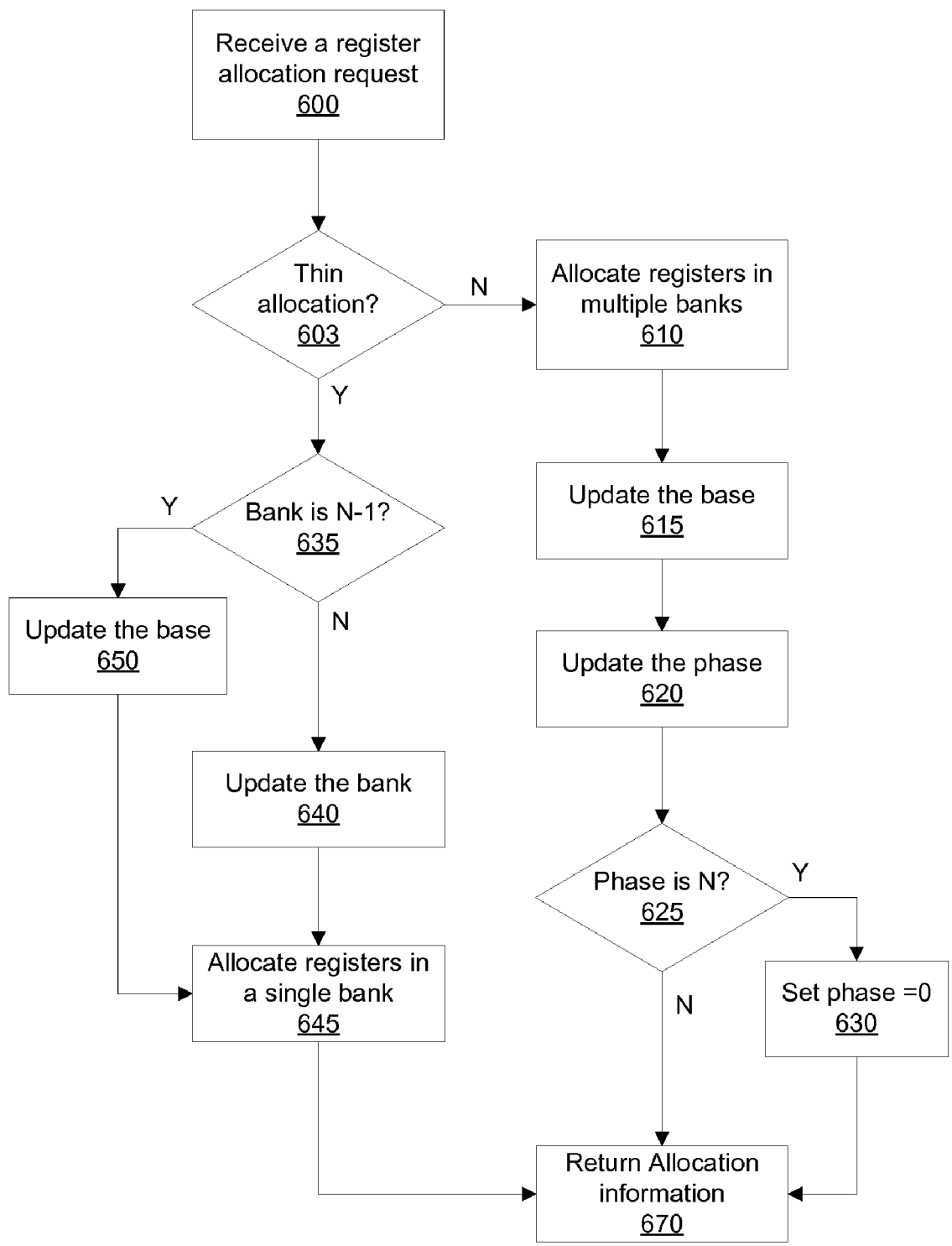
FIG. 6B illustrates an embodiment of another method of allocating registers for processing a thread in accordance with one or more aspects of the present invention.

FIG. 6B illustrates an embodiment of another method of allocating registers for processing a thread in accordance with one or more aspects of the present invention. In step 600 Register Address Unit 240 receives a register allocation request, including an allocation type of fat or thin. In some embodiments of the present invention, the allocation type is determined when the program instructions are compiled and is provided to Register Address Unit 240 by a driver. In step 603 Register Address Unit 240 determines if the specified allocation type is thin, and, if so, proceeds to steps 610, 615, 620, 625, 630, and 670, as previously described in conjunction with FIG. 6A. If, in step 603 Register Address Unit 240 determines that the specified allocation type is not thin, then Register Address Unit 240 proceeds to steps 635, 640, 645, 650, and 670, as previously described in conjunction with FIG. 6A.

Figure 6C:
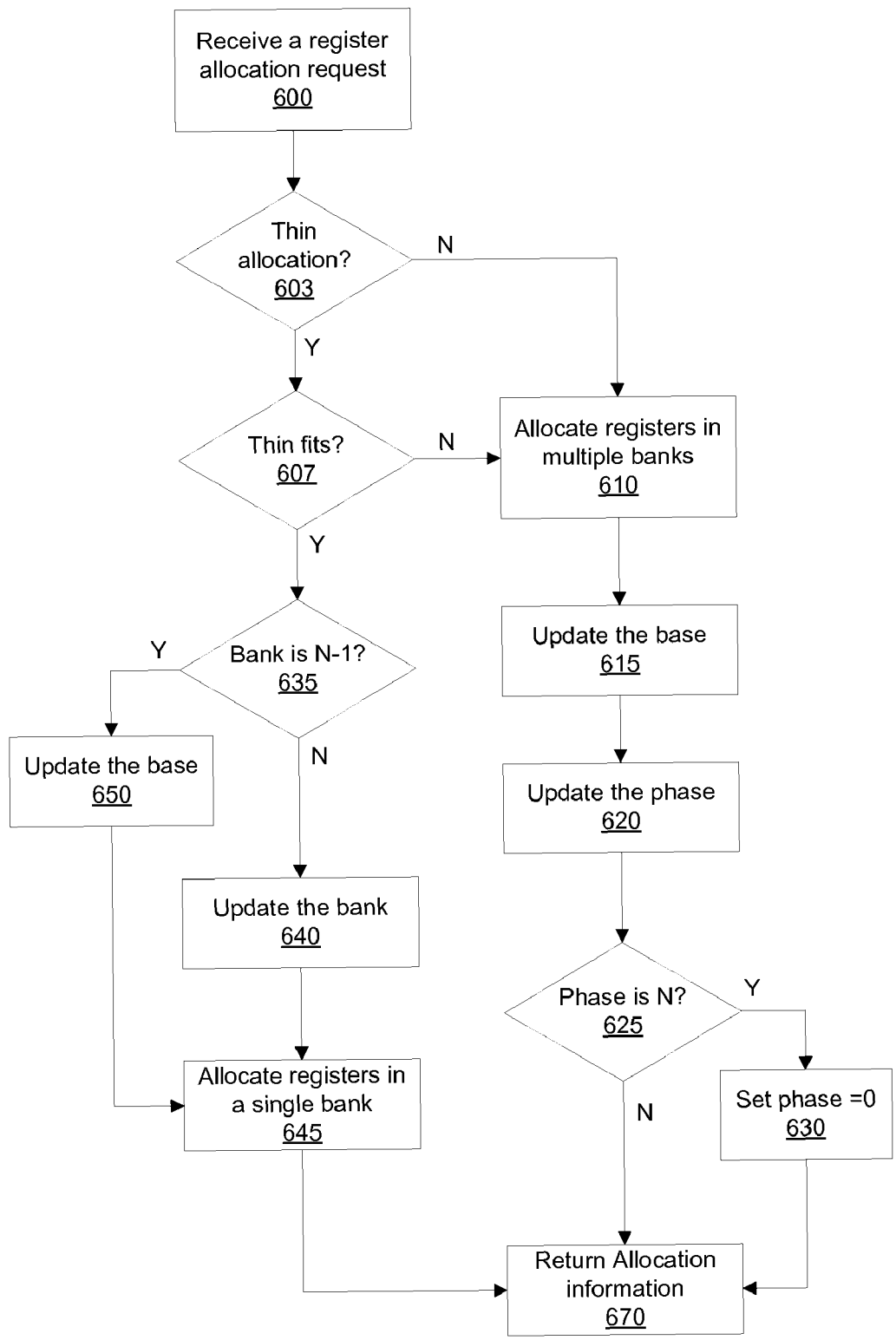
FIG. 6C illustrates an embodiment of another method of allocating registers for processing a thread in accordance with one or more aspects of the present invention.

FIG. 6C illustrates an embodiment of another method of allocating registers for processing a thread in accordance with one or more aspects of the present invention. In step 600 Register Address Unit 240 receives a register allocation request, including an allocation type of fat or thin. In step 603 Register Address Unit 240 determines if the specified allocation type is thin, and, if so, in step 607 Register Address Unit 240 determines if the thin allocation will fit, i.e., if the number of registers needed are available, within the Bank 320 specified by the bank indicator. If, in step 607 Register Address Unit 240 determines that the thin allocation will fit within the Bank 320, then Register Address Unit 240 proceeds to steps 635, 640, 645, 650, and 670, as previously described in conjunction with FIG. 6A.

If, in step 603 Register Address Unit 240 determines the specified allocation type is not thin, then Register Address Unit 240 proceeds to steps 610, 615, 620, 625, 630, and 670, as previously described in conjunction with FIG. 6A. If, in step 607 Register Address Unit 240 determines that the thin allocation will not fit within the Bank 230, then Register Address Unit 240 also proceeds to steps 610, 615, 620, 625, 630, and 670, as previously described in conjunction with FIG. 6A.

Therefore, persons skilled in the art will appreciate that any system configured to perform the method steps of FIGS. 6A, 6B, 6C, or their equivalents, is within the scope of the present invention. Furthermore, persons skilled in the art will appreciate that the method steps of FIGS. 6A, 6B, 6C, may be extended to support a register file unit including any number of banks to simulate a multi-ported memory.

Arbitrating Memory Bank Read Requests and Instruction Dispatching

Figure 7:
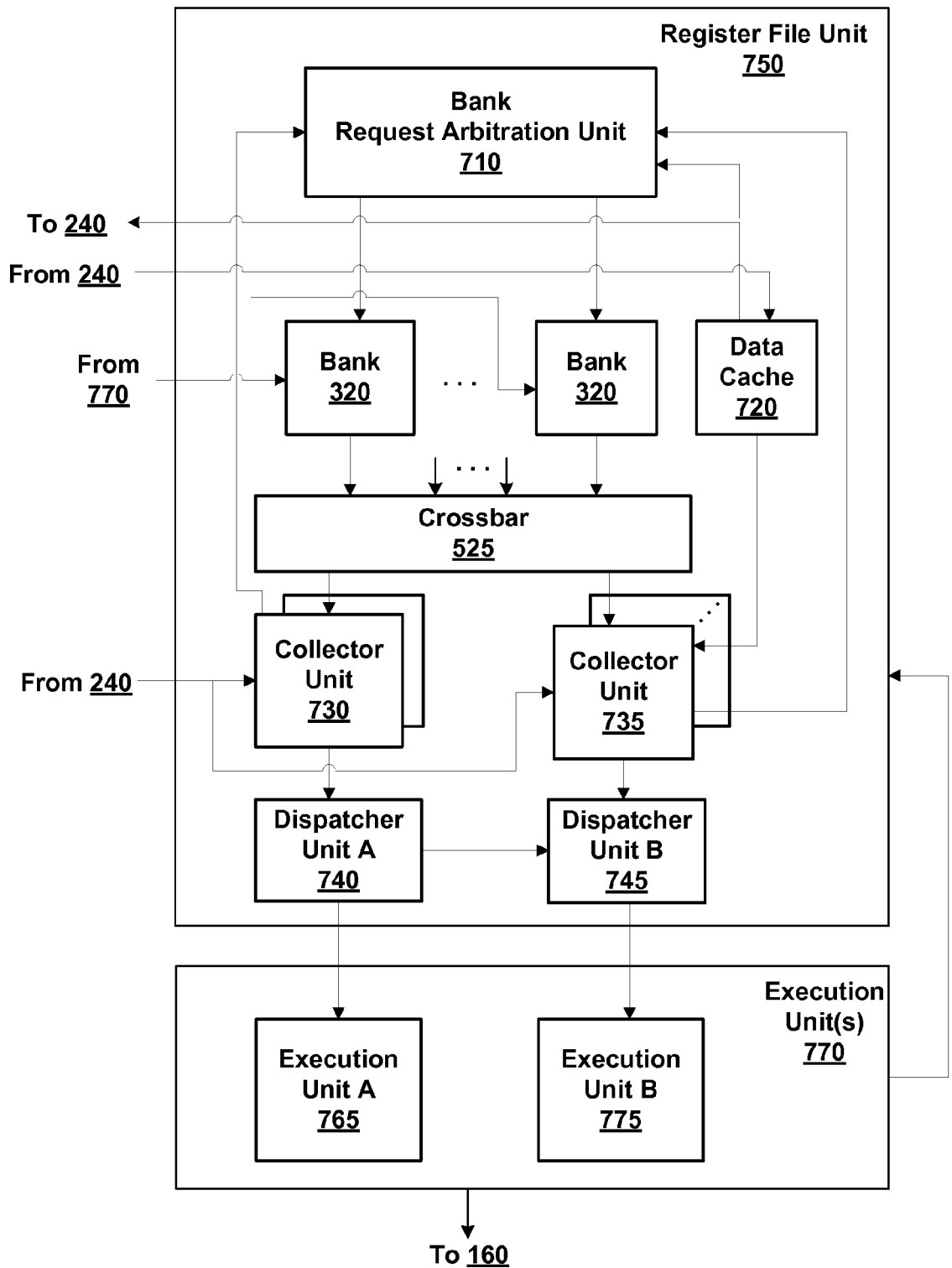
FIG. 7 is a block diagram of another exemplary embodiment of the Register File Unit and Execution Unit(s) of FIG. 2 in accordance with one or more aspects of the present invention.

FIG. 7 is a block diagram of another exemplary embodiment of the Register File Unit and Execution Unit(s) of FIG. 2, in accordance with one or more aspects of the present invention. Register File Unit 750 and Execution Unit(s) 770 perform the functions of Register File 250 and Execution Unit(s) 270, respectively. A Collector Unit 730 receives operand addresses and corresponding program instructions for execution by an Execution Unit A 765 from Register Address Unit 240. In some embodiments of the present invention, Execution Unit A 765 is configured to perform interpolation, reciprocal, square root, multiplication, logarithm, sine, cosine, and power function operations. In particular, Execution Unit A 765 may be configured to execute program instructions with up to two operands. For some of the program instructions two operands are read from one or more banks 320. For other program instructions two operands are read from another storage unit (not shown) that stores per primitive values, such as triangle attributes, plane equation coefficients, and the like. Additionally, two operands can be read from a combination of the per primitive value storage unit and Banks 320. Access to the per primitive value storage unit is arbitrated since more than one Collector Unit 735 and/or 730 may request access in single cycle.

A Collector Unit 735 receives operand addresses and corresponding program instructions for execution by an Execution Unit B 775, also from Register Address Unit 240. In some embodiments of the present invention, Execution Unit B 775 is configured to perform multiplication and multiplication-addition operations. In particular, Execution Unit B 775 is configured to execute instructions with up to three operands, where one of the operands may be a constant value read from a data cache 720. Execution Unit A 765 and Execution Unit B 775 may both be configured to execute program instructions that specify an immediate value for an operand. Furthermore, Execution Unit A 765 and Execution Unit B 775 may be configured to execute program instructions that specify operands from any combination of sources including banks 320, data cache 720, immediate values, and other storage resources (not shown).

Because Banks 320 (and other storage resources) are single-ported memories a clock cycle is needed to fetch each operand, unless the operands are stored in the same location (same address and bank). Different operand sources may have different fetch latencies, however, a single cycle is consumed to perform the read access, i.e., determine the location of the operand (bank 320, data cache 720, or immediate) and perform any necessary arbitration. Typical read access times for a SRAM (static random access memory) is 2 cycles, and more cycles may incurred if further circuitry, such as a crossbar and retiming registers are needed. In some embodiments of the present invention read accesses for data cache 720 require 3 cycles.

In order to provide a program instruction and operands to Execution Unit A 765 each clock cycle, two collector Units 730 collect operands for each program instruction for execution by Execution Unit A 765. The operand requests are arbitrated in a single clock cycle in order to provide the requested operands. In order to provide a program instruction and operands to Execution Unit B 775 each clock cycle, four collector Units 735 collect operands for each program instruction for execution by Execution Unit B 775. Generally, using a number of collectors that equals the number of operands allows for an instruction to be dispatched for execution each cycle since a clock cycle is usually needed to collect each operand. Including an extra collector compensates for clock cycles that are lost to bank conflicts and allows for program instructions to be dispatched as frequently as they can be processed. Requests from Collector Unit 730 have higher priority, so an extra collector is not needed to collect operands for Execution Unit A 765. One Collector Unit 735 is typically done collecting operands for an instruction every third clock cycle. Similarly, one Collector Unit 730 is typically done collecting operands for an instruction every other clock cycle. Additionally, a Bank request Arbitration Unit 710, a Dispatcher Unit A 740, and a Dispatcher Unit B 745 resolve arbitration conflicts for reading banks 320 and conflicts for writing banks 320, as described in conjunction with FIGS. 8, 9A, and 9B.

Collector Units 730 and 735 receive operand addresses and the corresponding program instruction from Register Address Unit 240 and output read requests to acquire the operands corresponding to the operand addresses. The requests are output to a Bank Request Arbitration Unit 710. Any Collector Unit 730 or 735 may request an operand stored in any one of the Banks 320. Bank Request Arbitration Unit 710 arbitrates between the different requests for each one of Banks 320 and each request is output by Bank Request Arbitration Unit 310 to the Bank 320 where the register assigned to the operand specified in the request is located, i.e., the register corresponding to the operand address. Additionally, read requests may be received by Bank Request Arbitration Unit 310 from external sources, such as Raster Operation Unit 160. Typically requests from external sources have lower priority than requests from Collector Units 730 and 735, however the arbitration priorities can be modified to increase the priority for external requests as needed to improve graphics processing performance. Program instructions remain in Collector Units 730 and 735 that are designated to gather the operands. Bank Request Arbitration Unit 310 is configured to output one request per clock cycle to each one of the Banks 320 that is coupled to the Bank Request Arbitration Unit 310.

As previously described in conjunction with FIG. 3, each Bank 320 includes a read request port for receiving requests from a Bank Request Arbitration Unit 710. Each Bank 320 also includes a write request port for receiving write requests from Execution Unit(s) 770 to write processed data to a destination register assigned to an operand specified by a program instruction. Therefore, 4 banks of lower port count memories (1 write port and 1 read port) are used to simulate a multi-port memory with 4 write ports and 4 read ports. In some embodiments of the present invention, each Bank 320 includes 128 entries that are 512 bits wide. During a clock cycle, each Bank 320 may output an operand specified by read request to a corresponding Collector Unit 730 or 735 via Crossbar 525. Therefore, when a program instruction specifies three operands for source data, at least three clock cycles are needed to gather the operands when they reside in the same Bank 320, i.e., when the registers for the thread are stored in a thin allocation. When a program instruction that specifies three operands is processed for a thread with registers allocated in a fat allocation, the collection of the operands may be completed in a single cycle. When there are bank conflicts to read operands stored in a fat allocation, the collection of the operands may require more than one clock cycle.

Sharing Banks 320 provides greater flexibility for accessing operands and saves die area when compared with using separate memories for Execution Unit A 765 and Execution Unit B 775. In order to maintain a high throughput, when possible an instruction is dispatched to Execution Unit A 765 and another instruction is dispatched to Execution Unit 775 in a single clock cycle. In some embodiments of the present invention, second set of single-ported banks is used to simulate a second multi-port memory that stores operands. This second set of banks may have a different read latency and a different number of banks than Banks 320. For example, in the preferred embodiment of the present invention, the second set of banks includes 16 banks and has a read access of 4 cycles. A second crossbar is needed to allow Collector Units 730 and 735 to gather source operands from the second set of banks. Furthermore, any bank within the second set may provide an operand to more than one sample position of a single Collector Unit 730 or 735 to perform multi-casting of the operands to multiple samples of a thread group. Finally, an additional request arbitration unit is needed to interface between Collector Units 730 and 735 and the second set of banks.

Collector Units 730 and 735 may also gather source data, such as constants and immediate data that are stored in registers outside of Banks 320 (not shown). Crossbar 525 receives source data stored in registers that are outside of Banks 320 from inputs (not shown). Execution Unit B 775 is configured to execute program instructions that specify operands that are constants read using an index. The index is used to read the constant from Data Cache 720. Register Address Unit 240 provides the index for each program instruction to Data Cache 720 directly and Data Cache 720 outputs the constants to Collector Unit 735.

When the constant is not available in Data Cache 720, i.e., when there is a cache miss, Data Cache 720 informs Register Address Unit 240 that a cache miss has occurred and the program instruction that specified the constant operand is discarded. Instruction Unit 230 reschedules discarded program instructions for execution at a later time, while ensuring that the program instruction order for each thread is preserved to avoid errors due to write after read hazards. Collector Units 735 also discard any program instruction that specifies a constant operand that produced a cache miss. In response to a cache miss, Data Cache 720 may read one or more constants from local memory 140, host memory 112, or another storage resource within graphics subsystem 170.

Execution Unit A 765 and Execution Unit B 775 are configured to process sixteen samples in parallel in a single-instruction multiple-data (SIMD) manner. Multiple threads are executed as a thread group to process N samples in parallel, where N may be 16, 32, or another integer value. In the preferred embodiment of the present invention N is 16 and Execution Unit A 765 and Execution Unit B 775 can each process 16 samples in parallel and Collector Units 730 and 735 each collect 16 operands for processing 16 samples. Furthermore, in the preferred embodiment of the present invention, an operand may be read from each one of the 16 banks in the second set of banks, in any combination, for processing the 16 samples. Since each of the threads executes the same program, processing threads as a group in a SIMD manner typically improves performance due to the locality of the operands and efficiency of performing operations in parallel. In some embodiments of the present invention, Execution Unit(s) 770 are configured to operate at twice the clock rate in order to process N samples is parallel with half the number of Execution Unit(s) 770. reducing the number of Execution Unit(s) 770 by doubling the clock rate is advantageous because die area and signal wire routing are reduced while the processing throughput is maintained.

In some circumstances, Data Cache 720 may need to read a different constant for each thread in a thread group. This condition can occur since the threads in a thread group are permitted to diverge during execution, in certain situations, such as when addresses are calculated dynamically. Although the constant operand is the same for all of the threads in the thread group, an index used to read the constant may be different for each thread in the thread group. When the indices match, a single read provides the constant operand for all of the threads in the thread group. When the indices do not match, the constant operand read is serialized and a different constant operand is read each clock cycle until one constant operand has been read for each unique index. A single Collector Unit 735 collects all of the constant operands for a thread group in a single cycle or in multiple cycles when the constant operand read is serialized.

When all of the operands are gathered by a Collector Unit 730 or 735, the program instruction is eligible for dispatch. Dispatcher Unit A 740 and Dispatcher Unit B 745 arbitrate between Collector Units 730 and Collector Units 735, respectively. Dispatcher Unit A 740 determines which of the eligible program instructions available in Collector Units 730 are output to Execution Unit A 765 and Dispatcher Unit B 745 determines which of the eligible program instructions available in Collector Units 735 are output to Execution Unit B 775, as described in conjunction with FIGS. 9A and 9B.

When execution of the program instruction is completed, Execution Unit(s) 770 outputs a write request to one of Banks 320 if a destination operand was specified by the program instruction. Execution Unit 770(s) may also output processed operands to Raster Operation Unit 160 via buffers or Register File Unit 750. In some embodiments of the present invention, each Execution Unit 770 processes more than one program instruction in parallel, resulting in a throughput of more than one instruction per clock cycle. Execution of different instructions may incur different fixed latencies as they are processed by Execution Unit A 765 and Execution Unit B 775. Although the latencies for reading operands may differ depending on where the operand is stored, e.g., Banks 320 or the second set of banks, the latencies are fixed. Because the latencies are fixed Dispatcher Unit A 740 and Dispatcher Unit B 745 are able to dispatch program instructions and avoid writeback conflicts. A writeback conflict occurs when Execution Unit A 765 and Execution Unit B 775 output a destination operand write to the same Bank 320 during a single clock cycle. A writeback conflict can also occur when Execution Unit A 765 and Execution Unit B 775 output a destination operand to Raster Operation Unit 160 during a single clock.

Some instructions may be executed by Execution Unit A 765 or Execution Unit B 775, and when one of those execution units is stalled due to bank conflicts, dispatch conflicts, and/or is processing a long latency instruction, Instruction Unit 230 may schedule those instructions for execution by the other execution unit in order to maintain a high processing throughput. In other embodiments of the present invention, the number of Banks 320 may be greater or smaller. The number of Collector Units 730 and/or Collector Unit 735 may be increased or decreased based on the number of Banks 320 and/or throughput of Execution Unit A 765 and/or Execution Unit B 775, respectively. Furthermore, additional execution units, collector units, and dispatcher units may be included within Execution Unit(s) 770 and Register File Unit 750, respectively. Importantly, Execution Unit(s) 770 may operate at maximum throughput by receiving an instruction each clock cycle. Therefore, a new instruction is dispatched each clock cycle, operands are gathered each clock cycle, and memory accesses are arbitrated in a single clock cycle to avoid buffering the requests and operands for several clock cycles.

Figure 8:
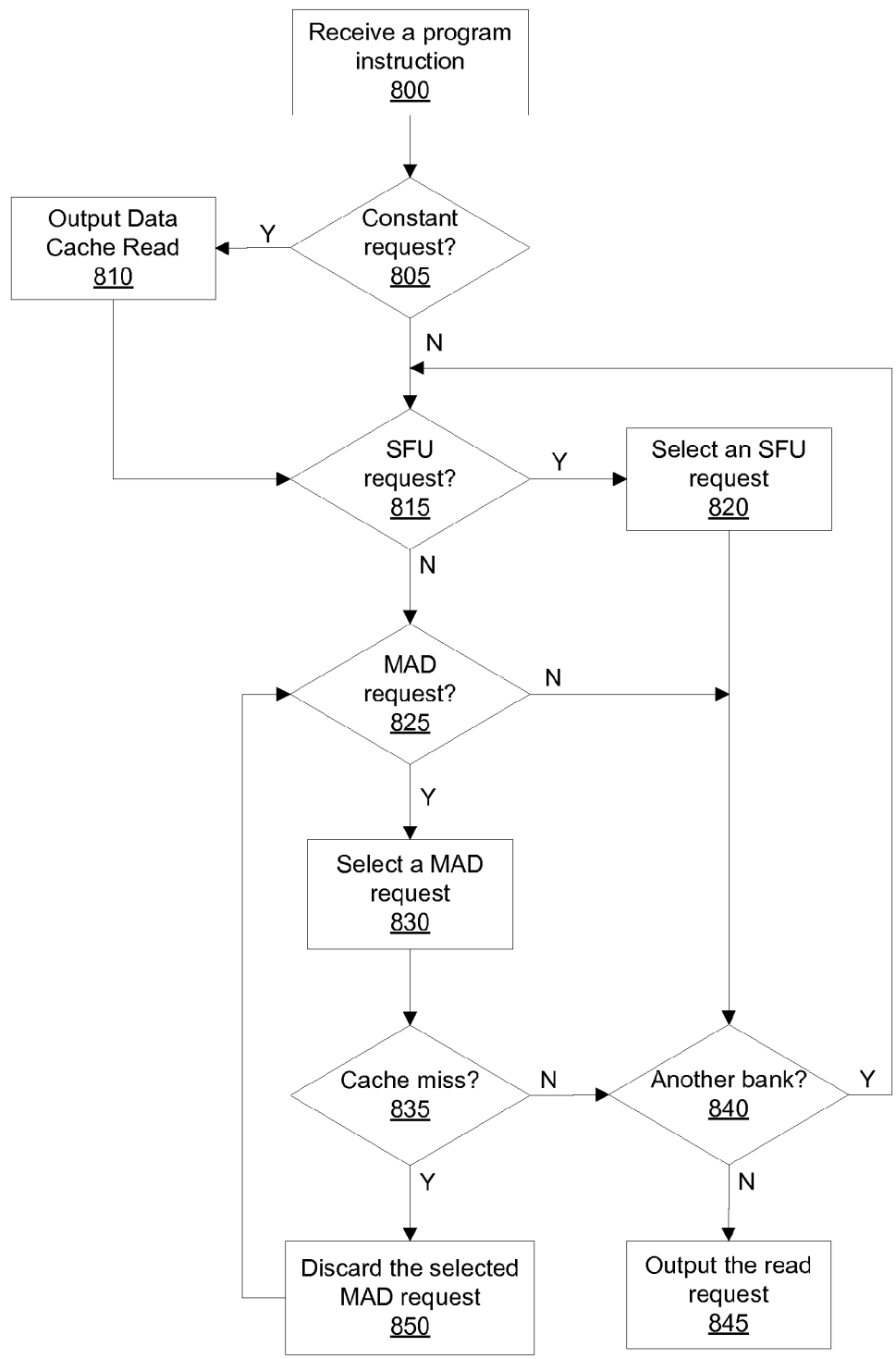
FIG. 8 illustrates an embodiment of a method of arbitrating memory bank read requests for collecting program instruction operands in accordance with one or more aspects of the present invention.

FIG. 8 illustrates an embodiment of a method of arbitrating memory bank read requests for collecting program instruction operands, in accordance with one or more aspects of the present invention. In step 800 Register File Unit 750 receives a program instruction from Register Address Unit 240. In step 805 Register File Unit 750 determines if the program instruction specifies a constant operand, and, if not, the method proceeds to step 815. Otherwise, in step 810, Register File Unit 750 provides the constant operand address to Data Cache 720 to read the constant operand. Data Cache 720 uses the constant operand address to read the indices for each of the threads and then reads a constant operand corresponding to each unique index.

Each Collector Unit 730 collects up to two operands from Banks 320 to dispatch a program instruction for execution of a thread group. Each Collector Unit 730 includes a slot for each operand, slot A and B, and up to four read requests may be presented by Collector Units 730 to Bank Request Arbitration Unit 710 for arbitration to access to one or more Banks 320. Each Collector Unit 735 collects up to three operands from Banks 320 to dispatch a program instruction for execution of a thread group. Each Collector Unit 735 includes a slot for each operand, slot A, B, and C, and up to twelve read requests may be presented by Collector Units 730 to Bank Request Arbitration Unit 710 for arbitration to access to one or more Banks 320. Therefore, as many as sixteen read requests may be arbitrated in a single cycle by Bank Request Arbitration Unit 710.

In step 815 Bank Request Arbitration Unit 710 determines if a read request is presented by Collector Units 730 for execution by Execution Unit A 765 (SFU). In one embodiment of the present invention, program instructions scheduled for execution by Execution Unit A 765 are designated as higher priority than program instructions scheduled for execution by Execution Unit B 775. In other embodiments of the present invention, Execution Unit B 775 may be designated as higher priority than Execution Unit A 765. If, in step 815 Bank Request Arbitration Unit 710 determines that a read request for a first Bank 320 is presented by Collector Units 730 for execution by Execution Unit A 765 (SFU), then in step 820 Bank Request Arbitration Unit 710 selects a read request for the first Bank 320.

Bank Request Arbitration Unit 710 may use a modified round-robin selection scheme to select between the read requests presented by Collector Units 730. In particular, when a first of the two operands has been requested for a program instruction, the request for the second of the two operands will be selected. Therefore, a second request from the Collector Unit 730 that presented the request for the first operand is selected in step 820. When both operands have been requested, a request from the Collector Unit 730 that was not selected by the Bank Request Arbitration Unit 710 is selected. When two requests are available for different program instructions, the oldest request is selected.

If, in step 815 Bank Request Arbitration Unit 710 determines that a read request for a first Bank 320 is not presented by Collector Units 730 for execution by Execution Unit A 765 (SFU), then in step 825 Bank Request Arbitration Unit 710 determines if a read request for a first Bank 320 is presented by Collector Units 735 for execution by Execution Unit B 775 (MAD). If, in step 825 Bank Request Arbitration Unit 710 determines that a read request for a first Bank 320 is not presented by Collector Units 735 for execution by Execution Unit B 775 (MAD), then Bank Request Arbitration Unit 710 proceeds to step 840 to determine if requests for another Bank 320 should be arbitrated. If, in step 825 Bank Request Arbitration Unit 710 determines that a read request for a first Bank 320 is presented by Collector Units 735 for execution by Execution Unit B 775 (MAD), then in step 830 Bank Request Arbitration Unit 710 selects a read request for the first Bank 320.

Bank Request Arbitration Unit 710 may use the previously described modified round-robin selection scheme to select between the read requests presented by Collector Units 730, allowing each Collector Unit 735 to complete all of the operand reads for a single program instruction before selecting another Collector Unit 735 using the round-robin scheme. In some embodiments of the present invention, the operands are read in a fixed order, such as the order that they are specified by the program instruction. In other embodiments of the present invention, the operands are read in any order needed to avoid bank conflicts. Reading all of the operands for a single program instruction before selecting another Collector Unit 735 allows for the program instruction to be dispatched as soon as possible, to maintain the processing throughput of Execution Unit(s) 770 and allow the Collector Unit 735 to begin fetching operands for another program instruction.

In step 835 Bank Request Arbitration Unit 710 determines if Data Cache 720 has indicated that a cache miss occurred for the program instruction corresponding to the read request selected in step 830. If so, then in step 850 the request selected in step 830 is discarded and the method returns to step 825 where Bank Request Arbitration Unit 710 determines if another request for the current Bank 320 is presented by Collector Units 735 for execution by Execution Unit B 775 (MAD). Additionally, Data Cache 720 notifies Instruction Unit 230 that a cache hit occurred for a constant read and Instruction Unit 230 reschedules the program instruction for output to Register File Unit 750. If, in step 835 Bank Request Arbitration Unit 710 determines that Data Cache 720 has not indicated that a cache miss occurred for the program instruction corresponding to the read request selected in step 830, then Bank Request Arbitration Unit 710 proceeds to step 840.

In step 840 Bank Request Arbitration Unit 710 determines if another Bank 320 should be arbitrated, and, if so, the method returns to step 815 where Bank Request Arbitration unit 710 arbitrates the requests for another Bank 320. If, in step 840 Bank Request Arbitration Unit 710 determines that another Bank 320 should not be arbitrated, i.e., all of the Banks 320 have been arbitrated, then in step 845 Bank Request Arbitration Unit 710 outputs the read requests for one or more Banks 320. In some embodiments of the present invention, additional read requests may be received from other processing units and those requests may be arbitrated along with read requests from Collector Units 730 and 735.

The bank arbitration rules described in conjunction with FIG. 8 are used to collect the operands for each instruction while avoiding bank conflicts that can introduce inefficiencies, such as idle clock cycles. Rules are also used for determining when to dispatch each program instruction and collected operands to Execution Unit A 765 and Execution Unit B 775 for processing. In particular, bank conflicts for writing destination operands produced by execution of the program instructions are identified and avoided when the instructions and collected operands are dispatched.

In some embodiments of the present invention, Execution Unit A 765 is configured to accept some instructions and operands less frequently than others. Specifically, Execution Unit A 765 may accept a new program instruction every second, third, or fourth clock cycle, depending on the particular program instruction. Dispatcher Unit A 740 accounts for these constraints and outputs the program instructions and operands as they can be accepted for processing by Execution Unit A 765. Dispatcher Unit A 740 also uses a round-robin scheme to select a program instruction and operands for dispatch from one of the two Collector Units 730 when both Collector Units 730 have eligible program instructions. Dispatcher Unit A 740 also ensures that program instructions for each thread are dispatched in the order that they are received by Register File Unit 750 to avoid write after read (WAR) hazards. Therefore, the eligible program instructions for each thread may be dispatched based on age, i.e., older eligible program instructions are given priority over younger eligible program instructions.

Figure 9A:
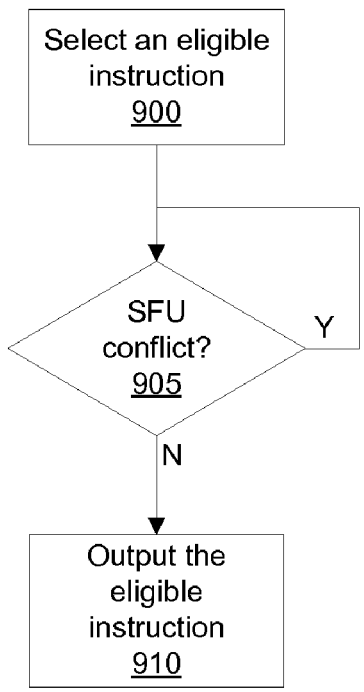
FIG. 9A illustrates an embodiment of a method of dispatching program instructions and collected operands for processing a thread in accordance with one or more aspects of the present invention.

FIG. 9A illustrates an embodiment of a method of dispatching program instructions and collected operands for processing threads, in accordance with one or more aspects of the present invention. In step 900 Dispatcher Unit B 745 selects an eligible instruction from Collector Units 735. Dispatcher Unit B 745 is configured to use a round-robin scheme to select a program instruction and operands for dispatch while ensuring that the eligible program instructions for each thread are dispatched in order to avoid WAR hazards. In step 905 Dispatcher Unit B 745 determines if a writeback conflict will occur between the program instruction selected in step 900 and a destination operand produced by Execution Unit A 765 during the writeback clock cycle. The method remains at step 905 until any writeback conflict with the selected program instruction is avoided, and then proceeds to step 910. In step 910 Dispatcher Unit B 745 outputs the selected program instruction and operands for processing by Execution Unit B 775.

Figure 9B:
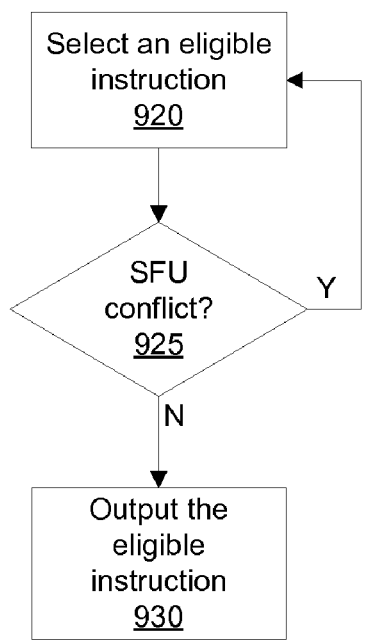
FIG. 9B illustrates an embodiment of another method of dispatching program instructions and collected operands for processing a thread in accordance with one or more aspects of the present invention.

FIG. 9B illustrates an embodiment of another method of dispatching program instructions and collected operands for processing threads, in accordance with one or more aspects of the present invention. In step 920 Dispatcher Unit B 745 selects an eligible instruction from Collector Units 735 using the techniques described in conjunction with step 900. In step 925 Dispatcher Unit B 745 determines if a writeback conflict will occur between the program instruction selected in step 920 and a destination operand produced by Execution Unit A 765 during the writeback clock cycle.

Different program instructions may have different execution time, so the latency between when a program instruction is dispatched and when a destination operand is produced may vary for the different instructions. However, the latency incurred to execute each type of program instruction is fixed and Dispatcher Unit B 745 accounts for these fixed latencies when identifying writeback conflicts. If, in step 925 Dispatcher Unit B 745 determines that a writeback conflict will occur, then the method returns to step 920 where Dispatcher Unit B 745 selects a different program instruction from the eligible instructions. If, in step 925 Dispatcher Unit B 745 determines that a writeback conflict will not occur, then in step 930 Dispatcher Unit B 745 outputs the selected program instruction and operands for processing by Execution Unit B 775.

Each instruction being processed in Register File Unit 750 has a variable processing latency, due to many arbitration and execution latencies due to bank read conflicts, bank write conflicts, dispatch conflicts, external accesses, and the like. Feedback signals that provide information to instruction unit 230 from Register File Unit 250 are used to allocate registers and facilitate instruction issuing to maximize the processing throughput of Execution Unit(s) 770.

The instruction processing can be finished out-of-order, even for the same type of instructions that are processed in the same execution unit within Execution Unit(s) 770. This is a consequence of the bank conflict arbitration and instruction dispatching that are designed to achieve maximum throughput of Execution Unit(s) 770, that is not constrained by processing instructions in a strict first-in-first-out manner. For example, a later instruction only take one cycle to collect its operands, and can therefore be issued ahead of an earlier instruction which takes more cycles to collect its operands. In another example, a later instruction is chosen to be dispatched before an earlier instruction when the later instruction does not have a writeback conflict and the earlier instruction does. The objective is to allow instructions to be issued when all of the operands have been collected and there is not a writeback conflict.

Persons skilled in the art will appreciate that any system configured to perform the method steps of FIGS. 8, 9A, 9B, or their equivalents, is within the scope of the present invention. Furthermore, persons skilled in the art will appreciate that the method steps of FIGS. 8, 9A, 9B, may be extended to support a register file unit including any number of banks to simulate a multi-ported memory and any number of execution units configured to process the program instructions and collected operands.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of arbitrating read requests for a memory bank, comprising: receiving a first read request for a first operand that is stored in the memory bank and specified by a first program instruction to be executed by a first execution pipeline; receiving a second read request for a second operand that is stored in the memory bank and specified by a second program instruction to be executed by the first execution pipeline; selecting the first read request for the memory bank; determining that a cache miss has occurred for a constant read request to read a constant operand associated with the first program instruction; discarding the first program instruction when a constant read cache miss has occurred for the constant read request; selecting the second read request for the memory bank; receiving the constant operand specified by the first program instruction; reading the first operand from the memory bank; dispatching the first program instruction to the first execution pipeline for execution; determining that the constant indices for the constant operand do not match, wherein each constant index corresponds to a different thread in a thread group; and serializing the constant read request to read different constant operands for each different constant index specified by the first program instruction.

2. The method of claim 1, further comprising the steps of:
reading the second operand from the memory bank; and
dispatching the second program instruction to the first execution pipeline for execution.

3. The method of claim 2, further comprising the step of processing the second program instruction to execute threads in a thread group in parallel and produce a destination operand that is specified for the thread group by the second program instruction.

4. The method of claim 1, further comprising the steps of:
receiving a third read request for a third operand that is stored in the memory bank and specified by the second program instruction to be executed by the first execution pipeline;
receiving a fourth read request for a fourth operand that is stored in the memory bank and specified by a third program instruction to be executed by a second execution pipeline;
selecting the fourth read request for the memory bank;
reading the fourth operand from the memory bank; and
dispatching the third program instruction to the second execution pipeline for execution.

5. The method of claim 1, further comprising the step of reading another operand specified by the first program instruction from another memory bank that is configured to function as a single multi-ported memory when combined with the memory bank.

6. The method of claim 1, wherein the first program instruction is included in a first program configured to process fragment data, and the second program instruction is included in a second program configured to process vertex data.

7. A method of dispatching program instructions and operands for execution, comprising: selecting a first program instruction and operands for execution by a first execution unit from a set of eligible program instructions to produce a value for storage in a first register that is specified by a first destination operand; determining if a writeback conflict exists for the first register and any destination operands that are produced by a second execution unit, wherein program instructions scheduled for execution by a second execution unit are designated as higher priority than program instructions scheduled for execution by the first execution unit; selecting a second program instruction and operands for execution by the first execution unit from the set of eligible program instructions when the writeback conflict exists; wherein the writeback conflict exists when the first register is within a first memory bank, and one of the destination operands that are produced by the second execution unit is specified for storage in a second register that is also within the first memory bank.

8. The method of claim 7, further comprising the step of dispatching the first program instruction and operands to the first execution unit when the writeback conflict does not exist.

9. The method of claim 8, further comprising the step of processing the first program instruction to execute threads in a thread group in parallel and produce the first destination operand for the thread group.

10. The method of claim 7, wherein the first program instruction and operands are selected for execution by the first execution unit from the set of eligible program instructions using round-robin arbitration.

11. The method of claim 7, wherein the first program instruction and a third program instruction in the set of eligible program instructions correspond to a first thread group and the second program instruction corresponds to a second thread group.

12. The method of claim 7, wherein the first program instruction is included in a first program configured to process fragment data, and the second program instruction is included in a second program configured to process vertex data.

13. A system for obtaining operands specified by program instructions, comprising: a first memory bank configured to store a first portion of the operands specified by the program instructions; a second memory bank configured to store a second portion of the operands specified by the program instructions; a bank request arbitration unit configured to arbitrate between multiple read requests for the first memory bank and the second memory bank based on an execution unit that is designated to process a program instruction corresponding to each one of the read requests, wherein the bank request arbitration unit is further configured to discard read requests that specify a constant operand that produces a cache miss; a first collector unit configured to submit first operand read requests to the bank request arbitration unit and receive the operands that are specified by a first portion of the program instructions that are scheduled for processing by a first execution unit; a second collector unit configured to submit second operand read requests to the bank request arbitration unit and receive the operands that are specified by a second portion of the program instructions that are scheduled for processing by a second execution unit; a data cache coupled to the second collector unit and configured to store constant operands specified by the second portion of the program instructions; wherein the data cache is further configured to serialize constant read requests when constant indices for the constant operand corresponding to multiple threads in a thread group do not match to read a different constant operand for each different constant index.

14. The system of claim 13, further comprising a crossbar unit coupling the first memory bank and the second memory bank to the first collector unit in order for the first collector unit to receive the operands that are specified by the first portion of the program instructions.

15. The system of claim 13, further comprising a first dispatcher unit that is coupled to the first collector unit and configured to output the first portion of the program instructions as well as the operands that are specified by the first portion of the program instructions.

16. The system of claim 15, further comprising a first execution unit that is coupled to the first dispatcher unit and configured to process the first portion of the program instructions output by the first dispatcher unit and store destination operands specified by the first portion of the program instructions in the first memory bank and the second memory bank.

17. The system of claim 16, wherein the first execution unit is configured as a multithreaded execution unit that executes the first portion of the program instructions in parallel to produce the destination operands.

18. The system of claim 15, further comprising a second dispatcher unit that is coupled to the second collector unit and configured to output the second portion of the program instructions as well as the operands that are specified by the second portion of the program instructions when a writeback conflict does not exist with the destination operands output by the first execution unit for a particular clock cycle.

19. The system of claim 18, further comprising a second execution unit that is coupled to the second dispatcher unit and configured to process the second portion of the program instructions output by the second dispatcher unit and store destination operands specified by the second portion of the program instructions in the first memory bank and the second memory bank.

20. The system of claim 18, wherein the writeback conflict exists when the operands specified by the second portion of the program instructions will be written to the first memory bank, and the destination operands output by the first execution unit will also be written to the first memory bank or when the operands specified by the second portion of the program instructions will be written to the second memory bank, and the destination operands output by the first execution unit will also be written to the second memory bank.

* * * * *